(12) United States Patent
Saldanha et al.

(10) Patent No.: US 10,733,297 B2
(45) Date of Patent: Aug. 4, 2020

(54) REAL-TIME SIGNATURELESS MALWARE DETECTION

(71) Applicant: Juniper Networks, Inc., Sunnyvale, CA (US)

(72) Inventors: Anoop Wilbur Saldanha, Bangalore (IN); Abhijit Mohanta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 160 days.

(21) Appl. No.: 16/117,815

(22) Filed: Aug. 30, 2018

(65) Prior Publication Data

US 2020/0012794 A1    Jan. 9, 2020

(30) Foreign Application Priority Data

Jul. 9, 2018    (IN) .............................. 201841025522

(51) Int. Cl.
| G06F 21/56 | (2013.01) |
| H04L 29/06 | (2006.01) |
| G06F 21/55 | (2013.01) |
| G06F 21/53 | (2013.01) |

(52) U.S. Cl.
CPC ............ *G06F 21/568* (2013.01); *G06F 21/53* (2013.01); *G06F 21/552* (2013.01); *G06F 21/554* (2013.01); *G06F 21/562* (2013.01)

(58) Field of Classification Search
CPC ....... H04L 63/14; G06F 21/56; G06F 21/566; G06F 21/50
See application file for complete search history.

(56) References Cited

U.S. PATENT DOCUMENTS

| 5,440,723 | A | 8/1995 | Arnold et al. | |
| 7,904,959 | B2* | 3/2011 | Sidiroglou ............ | G06F 21/554 726/22 |
| 9,479,526 | B1* | 10/2016 | Yang ..................... | G06F 21/577 |
| 2016/0042179 | A1* | 2/2016 | Weingarten ........... | G06F 21/566 726/23 |
| 2017/0134423 | A1 | 5/2017 | Sysman et al. | |
| 2017/0235949 | A1 | 8/2017 | Niemela et al. | |

OTHER PUBLICATIONS

Extended European Search Report for Application No. EP19166342. 6, dated Nov. 11, 2019, 9 pages.

* cited by examiner

*Primary Examiner* — Izunna Okeke
(74) *Attorney, Agent, or Firm* — Harrity & Harrity, LLP

(57) ABSTRACT

A device may generate versions of a first executable process that is associated with deterministically defined parameters. The device may run the versions of the first executable process, and may monitor device parameters of the device or the first executable process when running the versions of the first executable process. The device may determine, based on monitoring the device parameters of the device or the first executable process, a variance to a parameter of the deterministically defined parameters relative to an expected value for the parameter, and may provide information indicating a presence of malware in connection with the device based on determining the variance to the parameter.

20 Claims, 9 Drawing Sheets ical process to perform malicious activities. Current approaches may identify malware using signatures associated with previously identified malware. However, such approaches may not detect other types of malware, such as malware that does not have an identified signature, malware that includes a modified signature, and/or the like.

REAL-TIME SIGNATURELESS MALWARE DETECTION

RELATED APPLICATION(S)

This application claims priority under 35 U.S.C. § 119 to Indian Patent Application No. 201841025522, filed on Jul. 9, 2018, the content of which is incorporated by reference herein in its entirety.

BACKGROUND

Malware (i.e., malicious software) may refer to any software used to disrupt the operations of a computer, a network device, or a mobile device. This may include gathering sensitive information, gaining access to private computer systems, encrypting files, and/or displaying unwanted advertising. Malware may include viruses, worms, Trojan horses, adware, spyware, ransomware, keyboard loggers, phishing, and/or the like.

SUMMARY

According to some possible implementations, a device may include one or more memories and one or more processors to generate one or more versions of a first executable process, wherein the first executable process is associated with one or more deterministically defined parameters, wherein the one or more versions of the first executable process share one or more common properties with one or more corresponding second executable processes of the device, and wherein the one or more versions of the first executable process are one or more executable processes that are designed to resemble the one or more corresponding second executable processes and the one or more corresponding second executable processes are one or more legitimate executable processes that are designed to perform one or more functions on the device. The one or more processors may run the one or more versions of the first executable process, and may monitor one or more device parameters of the device when running the one or more versions of the first executable process. The one or more processors may determine, based on monitoring the one or more device parameters of the device, a variance to a parameter of the one or more deterministically defined parameters relative to an expected value for the parameter, and may provide information indicating a presence of malware in connection with the device based on determining the variance to the parameter.

According to some possible implementations, a non-transitory computer-readable medium may store instructions that include one or more instructions that, when executed by one or more processors of a device, cause the one or more processors to generate a first executable process, wherein the first executable process is associated with a deterministically defined memory map. The one or more instructions may cause the one or more processors to execute the first executable process in the endpoint device, wherein the first executable process shares one or more common properties with a second executable process of the endpoint device, and wherein the first executable process is an executable process that is designed to resemble the second executable process and the second executable process is a legitimate executable process that is designed to perform a function on the endpoint device. The one or more instructions may cause the one or more processors to monitor a memory map of the endpoint device or the first executable process during execution of the first executable process, and to determine, based on monitoring the memory map, a variance to the memory map relative to the deterministically defined memory map. The one or more instructions may cause the one or more processors to detect a presence of a malware without a signature and in connection with the endpoint device based on determining the variance to the memory map, and to provide information indicating the presence of the malware in connection with the endpoint device based on detecting the presence of the malware According to some possible implementations, a method may include generating, by a device, a first executable process, wherein the first executable process is associated with one or more deterministically defined parameters. The method may include executing, by the device, one or more versions of the first executable process in the device, wherein the one or more versions of the first executable process shares one or more properties with one or more corresponding second executable processes of the device, and wherein the one or more versions of the first executable process are one or more executable processes that are designed to resemble the one or more corresponding second executable processes and the one or more corresponding second executable processes are one or more legitimate executable processes that are designed to perform one or more functions on the device. The method may include monitoring, by the device, one or more device parameters of the device during execution of the one or more versions of the first executable process, and determining, by the device and based on monitoring the one or more device parameters of the device, a variance to a parameter of the one or more deterministically defined parameters relative to an expected value for the parameter. The method may include detecting, by the device, a presence of a malware without using a signature based on determining the variance to the parameter, and automatically altering, by the device, one or more device parameters as a response to the presence of the malware.

DETAILED DESCRIPTION

Figure 1A:
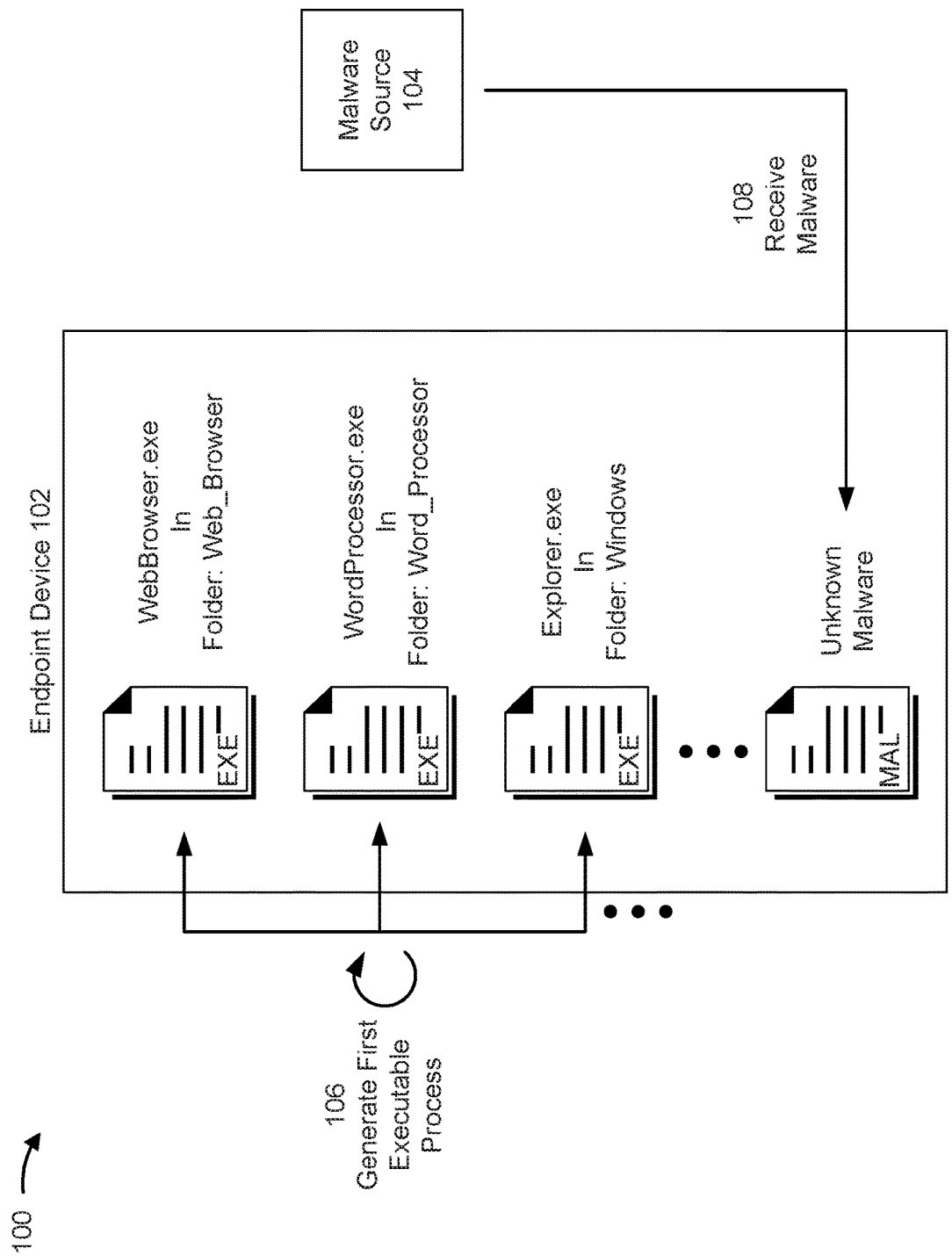
FIGS. 1A-1C are diagrams of an example implementation described herein.

The following detailed description of example implementations refers to the accompanying drawings. The same reference numbers in different drawings may identify the same or similar elements.

Malware may be detrimental to any computing environment in which the malware is released. In some instances, malware may be released through activation of a malicious payload embedded or hidden within a file (e.g., a text file, an application document, an email attachment, etc.). In some instances, malware may inject code into a legitimate executable process on an endpoint device, such as an operating system process, an application (e.g., a web browser, a word processor, etc.), and/or the like. In this case, the malware may execute the code from within the legitimate executable process to steal data, delete data, and/or perform some other malicious purpose. When a security platform analyzes the legitimate executable process and/or a file corresponding to the legitimate executable process with injected code, the security platform may presume that the injected code is an allowable feature of the file because the injected code is not recognized as malware, but as a feature of the file. The security platform may use signatures to enable identification of malware; however, the security platform may not store information identifying signatures of new malware that have yet to be identified and classified. Moreover, obtaining data identifying signatures of malware may become increasingly resource intensive as a quantity of different types of malware increases, and may exceed a memory capability and/or a processing capability of increasingly miniaturized devices.

Some security platforms, such as anti-virus software, may operate on an endpoint device, such as a computer, a server, a traffic transfer device, and/or the like to detect malware. However, operation on an endpoint device may be resource intensive (e.g., processing resources, memory resources, and/or the like). Moreover, operation on an endpoint device may be time intensive as a result of processing limitations of the endpoint device and processing requirements of the security platform, and may result in instability in the endpoint device resulting from operation of the malware.

Thus, a security platform, operating externally to the endpoint device on dedicated hardware, may identify malware using a secure environment (e.g., a sandbox). The security platform may analyze a file, detect the malware (e.g., using static analysis, dynamic analysis, etc.), and block the file from performing a malicious purpose (e.g., by quarantining the file, blocking the file from further transmission, dropping the file, and/or the like). This may improve accuracy and reduce instability; however, detection of malware in a secure environment may result in substantial delays to transfer suspected malware from an endpoint device to a sandbox environment, determine that the suspected malware is malicious in the sandbox environment, provide a report indicating that the suspected malware is malicious to the endpoint device, and quarantine the malware at the endpoint device. Thus, hybrid solutions may attempt to operate a sandbox directly on an endpoint device. Such a hybrid solution may reduce delay and improve accuracy, but may still not achieve a speed of endpoint based solutions or an accuracy of external solutions.

Some implementations described herein provide for signatureless malware detection using a honeypot technique. For example, an endpoint device may generate a first executable process that corresponds to a second executable process (e.g., a dummy executable process that shares a common name, a common set of dependencies, and/or the like with, for example, a legitimate executable process, such as a web browser application, a word processor application, and/or the like). In this case, the endpoint device may run the first executable process, and may detect whether an observed set of parameters relating to the endpoint device or the first executable process differ from an expected set of parameters associated with the first executable process. Based on detecting a difference, the endpoint device may determine that malware has attempted to perform a malicious task during running of the first executable process, such as attempting to inject and execute code in the first executable process based on the malware confusing the first executable process for the second executable process. In this case, the endpoint device may determine a presence of malware, may analyze information relating to the first executable process to locate the malware, and may perform a remediation action to remove the malware, quarantine the malware, isolate the malware, and/or the like.

In this way, the endpoint device enables malware detection without requiring stored signature information and/or enables malware detection for malware for which a signature has not been determined. Moreover, based on operating on the endpoint device, rather than using a sandbox environment, the endpoint device enables malware detection to occur in real-time or near real-time with a relatively high level of accuracy. Further, based on using the first executable process to cause the malware to attempt to perform a malicious task, rather than attempting to use resource intensive antivirus software, the endpoint device reduces resource usage and improves stability of the monitored system.

Accordingly, some implementations described herein may prevent malware from harming targeted systems, and thus prevent system failures, shutdowns, inoperability, security breaches, loss of files or information (e.g., personal or financial information), theft, and/or the like. Therefore, some implementations herein may ensure the health of a system by preventing a malware attack, thus, conserving resources, time, and costs of handling an attacked system and/or recovering the system from the potential malware attack.

Figure 1B:
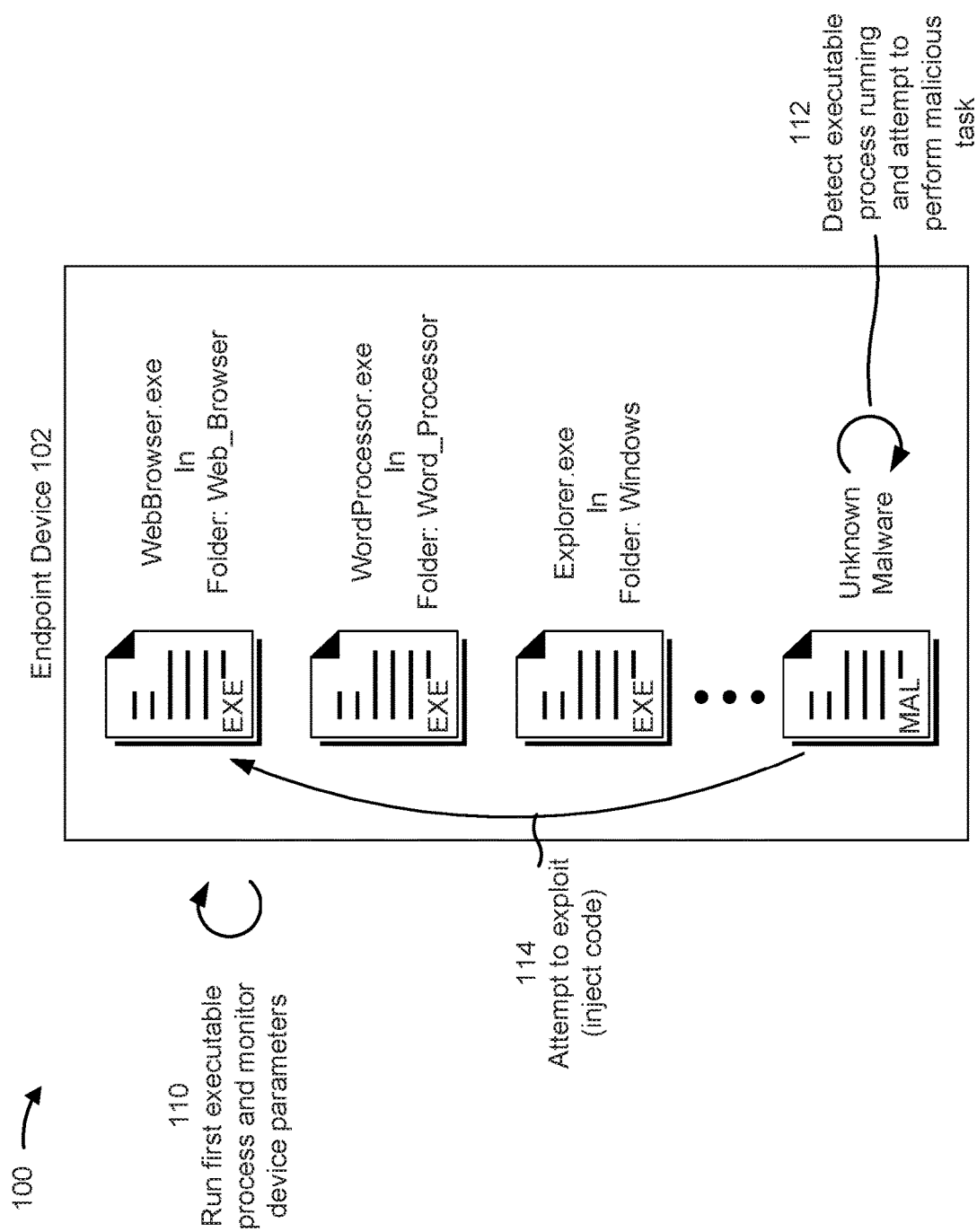
Figure 1C:
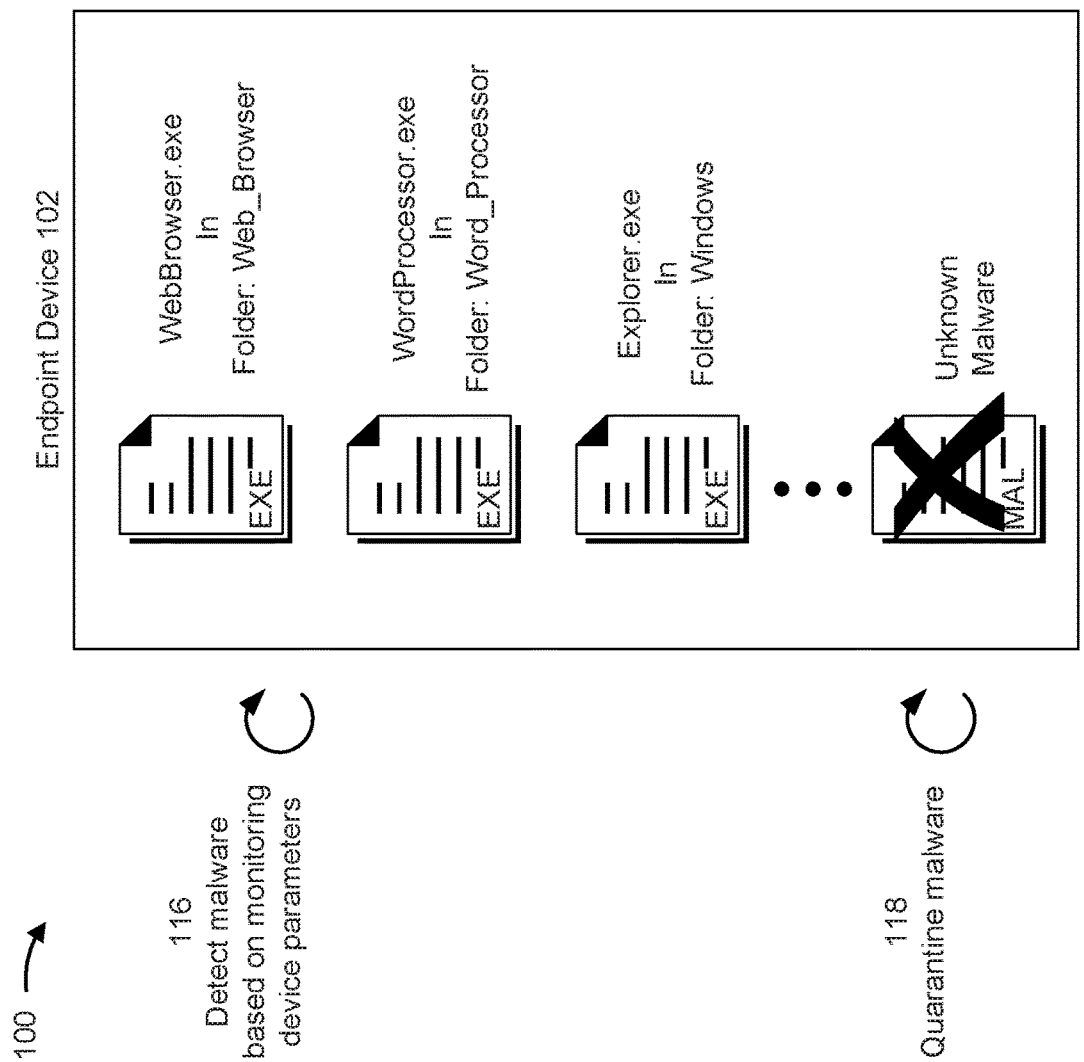

FIGS. 1A-1C are diagrams of an example implementation 100 described herein. As shown in FIGS. 1A-1C, example implementation 100 may include an endpoint device 102 and a malware source 104. In some implementations, endpoint device 102 may be a device that may perform malware detection on malware targeting and/or installed on endpoint device 102, thereby improving a speed of malware detection relative to sandbox environment-based detection on a sandbox environment device external to an endpoint device. For example, endpoint device 102 may be a client device (e.g., a computer, a mobile device, etc.), a network device (e.g., a router, a switch, etc.), a server device, and/or the like. In the description to follow, endpoint device 102 will be described as a client device. The description to follow is also applicable to other types of endpoint devices 102, such as a network device, a server device, and/or the like.

As further shown in FIG. 1A, and by reference number 106, endpoint device 102 may generate a first executable process. For example, endpoint device 102 may generate the first executable process to correspond to a second executable process. In this case, the first executable process may be a program for a honeypot process for malware intended to attack the second executable process. In other words, the second executable process may be a legitimate executable process, such as a web browser application (e.g., WebBrowser.exe, as shown, or another, such as iexplorer.exe, firefox.exe, etc.), a word processor application (e.g., WordProcessor.exe, as shown, or another, such as msword.exe, wordpad.exe, etc.), an operating system application (e.g., Explorer.exe, as shown, or another, such as svhost.exe, etc.), that malware may be intended to attack via a code injection attack and/or the like. In this case, the first executable process may be designed to resemble the second application. For example, the first executable process may share a common name with the second executable process. Additionally, or alternatively, the first executable process may share one or more other common properties with the second executable process. For example, the first executable process may be linked to one or more libraries of the second executable process, modules of the second executable process, dynamic-link libraries (.DLLs) of the second executable process, and/or the like to cause the first executable process to resemble the second executable process. In this way, the first executable process may be generated so that the first executable process resembles the second executable process (e.g., to malware that may be installed in endpoint device 102 and/or may target endpoint device 102).

In some implementations, endpoint device 102 may analyze one or more second executable processes of endpoint device 102 when generating the first executable process. For example, endpoint device 102 may determine a set of .DLL dependencies for a particular second executable process, and may use the set of .DLL dependencies to generate a first executable process corresponding to the particular second executable process. In this way, endpoint device 102 ensures that the first executable process resembles the corresponding second executable process.

Although some implementations, described herein, are described in terms of executable processes associated with a particular file format (e.g., .exe), other types of binaries are possible and/or file formats may be possible.

In some implementations, endpoint device 102 may generate a first executable process and/or one or more subprocesses associated therewith and associated with one or more deterministically defined parameters. For example, endpoint device 102 may generate the first executable process such that a memory map associated with the first executable process is known at one or more states of the first executable process. In this case, endpoint device 102 may store information identifying the memory map at the one or more states of the first executable process for comparing the memory map to an observed memory map during execution of the first executable process.

In some implementations, endpoint device 102 may generate one or more versions of the first executable process. For example, endpoint device 102 may store a generic first executable process, and may generate multiple versions of the generic first executable process corresponding to multiple different second executable processes. In this case, endpoint device 102 may establish different memory maps, different .DLL dependencies, and/or the like for each version of the first executable process. In some implementations, endpoint device 102 may generate and operate the first executable process using an agent. For example, endpoint device 102 may communicate with another device (e.g., a detection device, a security device, a server device, and/or the like), which may operate the agent on endpoint device 102. In this case, the other device may provide the first executable process to endpoint device 102, may use the agent to configure the first executable process, may use the agent to run the first executable process, and/or the like. In some implementations, endpoint device 102 may operate the first executable process in a sandbox environment. For example, the first executable process may be generated in the sandbox environment to determine whether another program (e.g., the second executable process, an item of malware, and/or the like) in the sandbox environment is malware.

As further shown in FIG. 1A, and by reference number 108, endpoint device 102 may receive malware, such as from malware source 104. For example, endpoint device 102 may be infected with a virus, worm, Trojan horse, adware, spyware, ransomware, keyboard logger, and/or the like. In some implementations, endpoint device 102 may be infected with malware to exploit an executable process. For example, endpoint device 102 may be infected with malware that attempts to inject malicious code into an executable process, such as to make the malicious code appear to be a legitimate process, to steal data being accessed and/or transferred by the executable process, to install a rootkit, and/or the like.

As shown in FIG. 1B, and by reference number 110, endpoint device 102 may run the first executable process and may monitor device parameters (e.g., a parameter of endpoint device 102, a parameter of the first executable process, etc.) based on monitoring the first executable process. For example, endpoint device 102 may execute the first executable process. In some implementations, endpoint device 102 may run one or more versions of the first executable process. For example, endpoint device 102 may run a first version of the first executable process resembling and corresponding to a web browser second executable process, a second version of the first executable process resembling and corresponding to a word processor second executable process, a third version of the first executable process resembling and corresponding to an operating system executable process, and/or the like. In this way, endpoint device 102 causes endpoint device 102 to appear to be running the legitimate second executable processes to attempt to cause, for example, a code injection attack by the unknown malware that may be detected by endpoint device 102.

In some implementations, endpoint device 102 may run a second executable process when running the first executable process. For example, endpoint device 102 may run the second executable process in a suspended mode, and may inject code of the first executable process into the second executable process, and may run the code based on injecting the code into the second executable process. In this way, endpoint device 102 may disguise that the code being run is associated with the first executable process rather than the second executable process, thereby increasing a likelihood of inducing the malware to attempt, for example, a code injection attack. In some implementations, endpoint device 102 may run the first executable process from a particular location. For example, endpoint device 102 may move the first executable process to a temporary folder, a folder with a common name shared with a corresponding second executable process, and/or the like, thereby increasing a likelihood of inducing the malware to attempt, for example, a code injection attack. In some implementations, endpoint device 102 may alter a working directory when running the first executable process. For example, endpoint device 102 may change a working directory of the first executable process to a corresponding working directory of a corresponding second executable process to cause the first executable process to appear to be the second executable process, thereby increasing a likelihood of inducing the malware to attempt, for example, a code injection attack.

In some implementations, endpoint device 102 may monitor one or more program identifiers (PIDs) based on running the first executable process. For example, endpoint device 102 may monitor a set of program identifiers of a set of programs running on endpoint device 102 to detect a new program running, a program that stops running, a change to a program identifier, and/or the like. Additionally, or alternatively, endpoint device 102 may monitor for one or more events, threads, processes, and/or the like that may be started, stopped, modified, and/or the like based on running the first executable process.

In some implementations, endpoint device 102 may monitor a memory map based on running the first executable process. For example, endpoint device 102 may determine a snapshot of the memory map, which may include information identifying a quantity of pages being used by a process relating to the first executable process, a permission associated with each page, an address of each page, and/or the like. Additionally, or alternatively, endpoint device 102 may determine information identifying a module of the first executable process to which a page is related, a property of the page (e.g., whether the page is classified as committed, reserved, private, and/or the like). Additionally, or alternatively, endpoint device 102 may determine a quantity of modules associated with the process relating to the first executable process, an ownership of each module in a region of memory (e.g., which process owns each module), and/or the like. In some implementations, endpoint device 102 may snapshot the memory map at a time before and/or concurrent with running the first executable process. Additionally, or alternatively, when executing program code of the first executable process from within the second executable process based on suspending the second executable process, endpoint device 102 may snapshot the memory map after resuming the second executable process to execute the program code.

As shown by reference numbers 112 and 114, the unknown malware of endpoint device 102 may detect that an executable process is running and may attempt to perform a malicious task. For example, the unknown malware may determine that the first executable process, which resembles a web browser, is running, and may attempt to inject code into the web browser to, for example, steal user data. In this case, the unknown malware may determine that the first executable process is running based on the unknown malware running on endpoint device 102 as a background process to monitor for an application called WebBrowser.exe, which may be a web browser that the unknown malware is designed to exploit, to run. Based on detecting that WebBrowser.exe is running, the unknown malware may attempt to perform the malicious task. In this case, the unknown malware may control endpoint device 102 to inject code into the first executable process, exfiltrate data from the first executable process, modify a registry or kernel module associated with the first executable process, and/or the like. In this way, endpoint device 102 may cause the unknown malware to attack the first executable process, which uses the title, WebBrowser.exe, and imitates an actual application, rather than the second executable process, which is the actual application WebBrowser.exe, thereby enabling endpoint device 102 to detect the unknown malware's attempt to perform a malicious task.

As shown in FIG. 1C, and by reference number 116, endpoint device 102 may detect the malware based on monitoring device parameters. For example, endpoint device 102 may compare observed device parameters to one or more expected device parameters, and may detect the malware based on determining a variance between the observed device parameters (and process parameters associated with the first executable process) and the one or more expected device parameters. In some implementations, endpoint device 102 may compare a stored memory map to an observed memory map to detect the malware. For example, endpoint device 102 may compare one or more observed memory values, states, ownership relationships, and/or the like to stored information identifying expected values, states, ownership relationships, and/or the like based on running the first executable process. In this case, based on determining that the observed memory map does not match the expected memory map, endpoint device 102 may determine that malware has attempted to alter operation of the first executable process (e.g., the unknown malware has attempted to inject code into the first executable process), thereby indicating a presence of malware on endpoint device 102. In this way, endpoint device 102 may determine the presence of malware on endpoint device 102 without using a signature for the unknown malware, in a case where the unknown malware has yet to be detected and does not have a determined signature, and/or the like, thereby improving malware detection.

In some implementations, endpoint device 102 may analyze one or more device properties to determine the malware. For example, endpoint device 102 may identify one or more new pages or altered pages based on comparing the expected memory map to the observed memory map, and may analyze the one or more new pages or altered pages to determine that the unknown malware (e.g., a particular executable process on endpoint device 102) caused the one or more new pages or altered pages. In other words, endpoint device 102 may locate the unknown malware on endpoint device 102. In some implementations, endpoint device 102 may identify an artifact associated with a page, an indicator of compromise associated with a page, a mutex name, an Internet Protocol address, a web address, a domain name, a string, a registry key, a message, and/or the like, that enables endpoint device 102 to locate the unknown malware. In some implementations, endpoint device 102 may identify program code on a page, and may analyze the program code to identify a source of the unknown malware, an intended behavior of the unknown malware, and/or the like.

As shown by reference number 118, endpoint device 102 may quarantine the malware. For example, based on locating the unknown malware, endpoint device 102 may isolate the malware to avoid damage to endpoint device 102. Additionally, or alternatively, endpoint device 102 may perform another response action. For example, endpoint device 102 may transmit an alert providing information regarding the malware. Additionally, or alternatively, endpoint device 102 may provide the malware for further analysis to determine a mitigation solution, to generate a signature for the malware, and/or the like. In some implementations, endpoint device 102 may remove the malware. For example, based on detecting the presence of the malware, endpoint device 102 may determine, based on stored information, a procedure for removing the malware from endpoint device 102, and may perform the procedure to remove the malware.

Additionally, or alternatively, based on determining a variance to a parameter, endpoint device 102 may undo one or more actions performed by the malware on endpoint device 102 (e.g., revert one or more parameters, delete one or more files, change one or more registry keys, etc.). Additionally, or alternatively, endpoint device 102 may provide information associated with the malware to a sandbox environment for further analysis, and may perform the analysis using a sandbox environment. Additionally, or alternatively, endpoint device 102 may report information associated with the malware to a security service for use in preventing future attacks by the malware and/or by similar malware on other endpoint devices.

Although some implementations, described herein, are described in terms of a client device type of endpoint device 102 (e.g., detecting malware targeting, for example, a web browser application), endpoint device 102 may be another type of device. For example, when endpoint device 102 is a network device (e.g., a router), endpoint device 102 may generate a first executable process designed to resemble a second executable process (e.g., a routing software executable process, a switching software executable process, a gateway software executable process, etc.), may run the first executable process, and may detect malware stored on endpoint device 102 that is designed to attempt to attack the second executable process. Additionally, or alternatively, endpoint device 102 may detect malware associated with a packet being transferred by endpoint device 102 and that is designed to attempt to attack routing software during a transfer via endpoint device 102. In this case, based on enabling signatureless malware detecting in real-time or near real-time, endpoint device 102 enables improved security for a network device without reducing networking speeds to allow time-consuming sandbox environment-based security testing of packets.

In this way, endpoint device 102 uses a honeypot technique to enable signatureless detection of malware (e.g., detection of malware without using a signature and/or detection of malware for which a signature is not known). Moreover, based on using a first executable process designed to appear to be a second executable process that is a potential target of the malware, endpoint device 102 reduces a processing requirement and/or memory requirement associated with malware detection, thereby enabling real-time or near real-time malware detection and improving malware detection relative to sandbox environment-based solutions. Furthermore, endpoint device 102 improves an accuracy of malware detection relative to other endpoint-based solutions.

As indicated above, FIGS. 1A-1C are provided merely as an example. Other examples are possible and may differ from what was described with regard to FIGS. 1A-1C.

Figure 2:
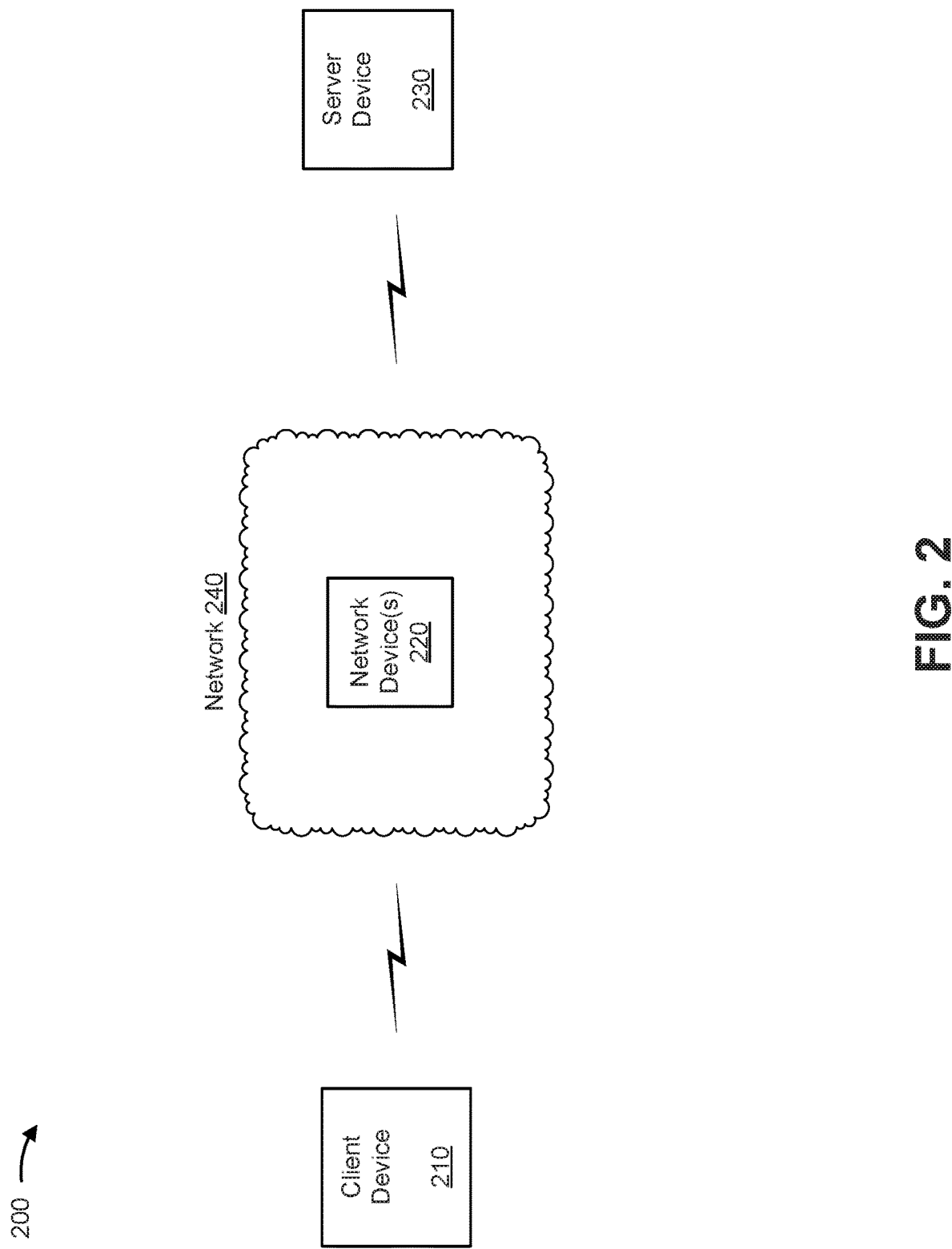
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, one or more network devices 220, a server device 230, and a network 240. Devices of environment 200 may interconnect via wired connections, wireless connections, or a combination of wired and wireless connections.

Client device 210 may include one or more devices capable of receiving, generating, storing, processing, and/or providing information associated with detecting malware. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may be an endpoint device that may be targeted by malware and which may store malware. In some implementations, client device 210 may operate a sandbox environment on client device 210. In some implementations, client device 210 may receive information from and/or transmit information to another device in environment 200.

Network device 220 includes one or more devices (e.g., one or more traffic transfer devices) capable of processing and/or transferring traffic between other devices. For example, network device 220 may include a firewall, a router, a gateway, a switch device, a hub, a bridge, a reverse proxy, a server (e.g., a proxy server), a top of rack (ToR) switch, a load balancer, a switch interface board, a controller, a switching element, a packet processing component, or a similar device. In some implementations, network device 220 may be an endpoint device that may be targeted by malware and which may store malware. In some implementations, network device 220 may operate a sandbox environment on network device 220. In some implementations, network device 220 may be a physical device implemented within a housing, such as a chassis. In some implementations, network device 220 may be a virtual device implemented by one or more computer devices of a cloud computing environment or a data center.

Server device 230 includes one or more devices capable of storing, processing, and/or routing information associated with detecting malware. For example, server device 230 may include a server that includes computing resources that may be utilized in connection with providing an executable process for malware detection, remotely running the executable process on and/or monitoring an endpoint device, such as network device 220, and/or the like. In some implementations, server device 230 may perform malware detection on server device 230 using a first executable process designed to resemble a second executable process. In some implementations, server device 230 may be an endpoint device that may be targeted by malware and which may store malware. In some implementations, server device 230 may operate a sandbox environment on server device 230. In some implementations, server device 230 may include a communication interface that allows server device 230 to receive information from and/or transmit information to other devices in environment 200.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a communications network, a telecommunications network, a private network, an ad hoc network, an intranet, the Internet, a fiber optic-based network, a cloud computing network, or the like, and/or a combination of these or other types of networks.

In some implementations, client device 210, network device 220, and/or server device 230 may be a virtual device implemented by one or more computing devices of a cloud computing environment or a data center.

The number and arrangement of devices shown in FIG. 2 are provided as an example. In practice, there may be additional devices, fewer devices, different devices and/or networks, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
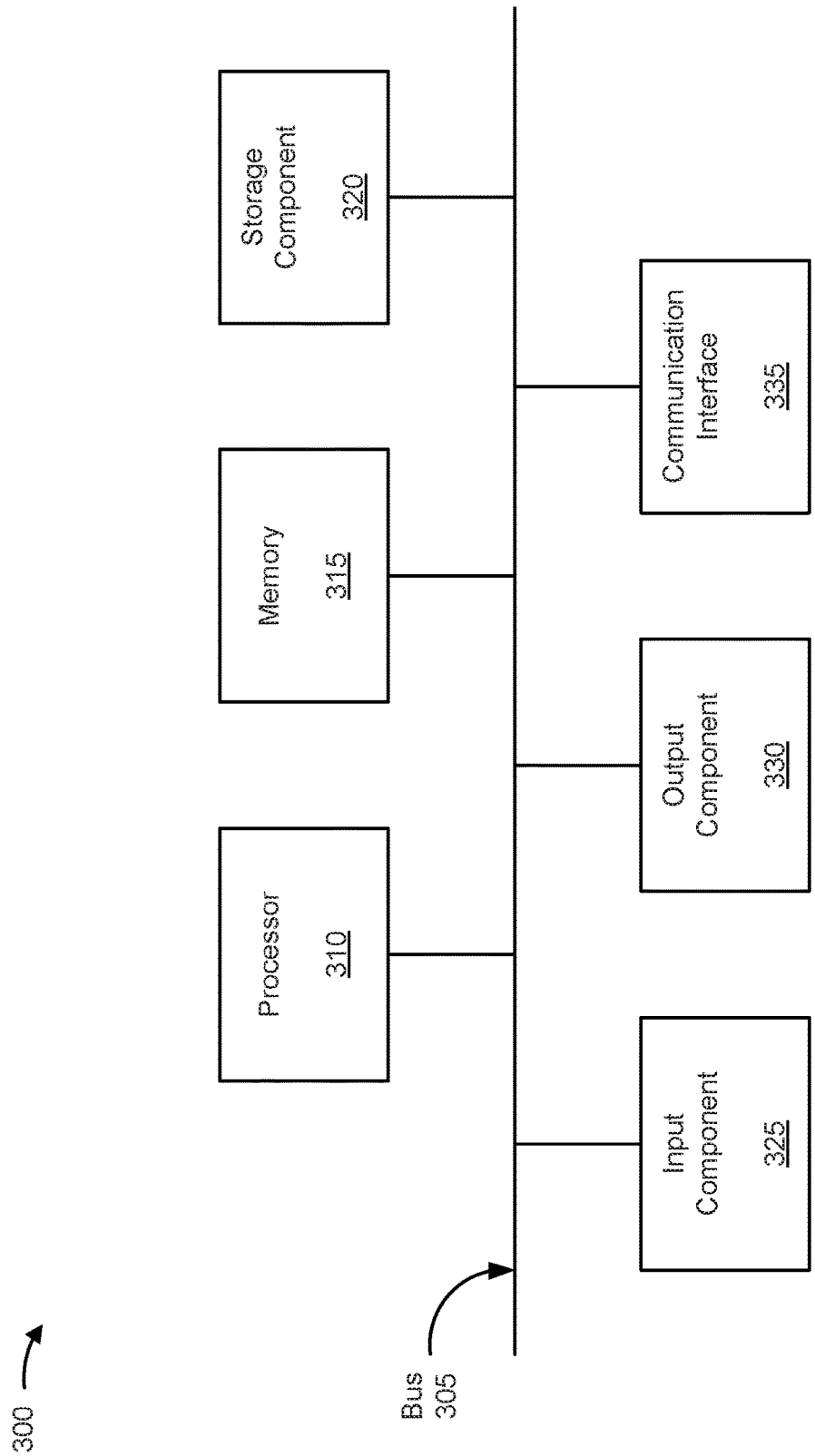
FIGS. 3A and 3B are diagrams of example components of one or more devices of FIG. 2.
Figure 3B:
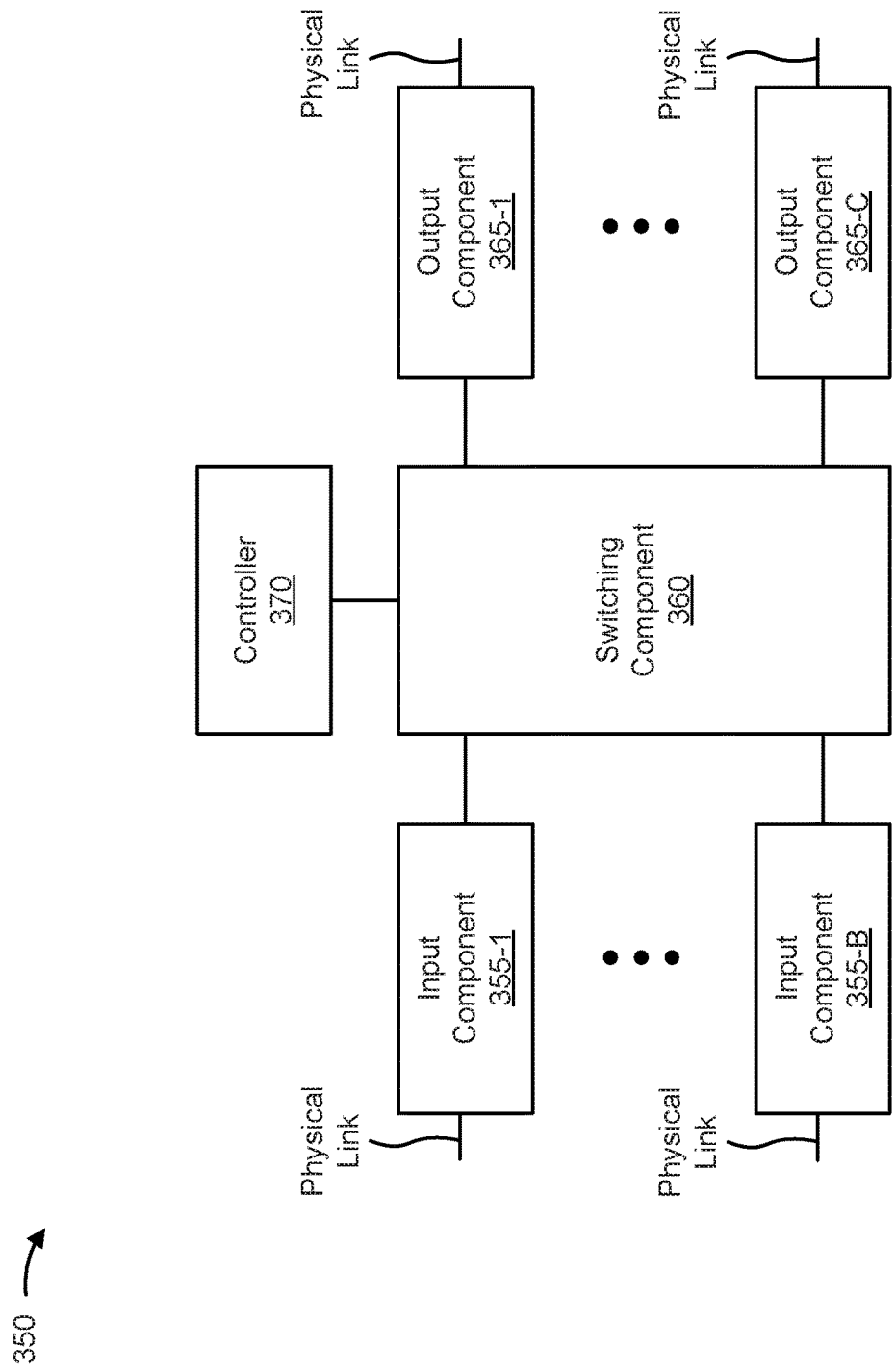

FIGS. 3A-3B are diagrams of example components of one or more devices of FIG. 2. FIG. 3A is a diagram of example components of a device 300. Device 300 may correspond to client device 210, network device 220, and/or server device 230. In some implementations, client device 210, network device 220, and/or server device 230 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to network device 220. In some implementations, network device 220 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
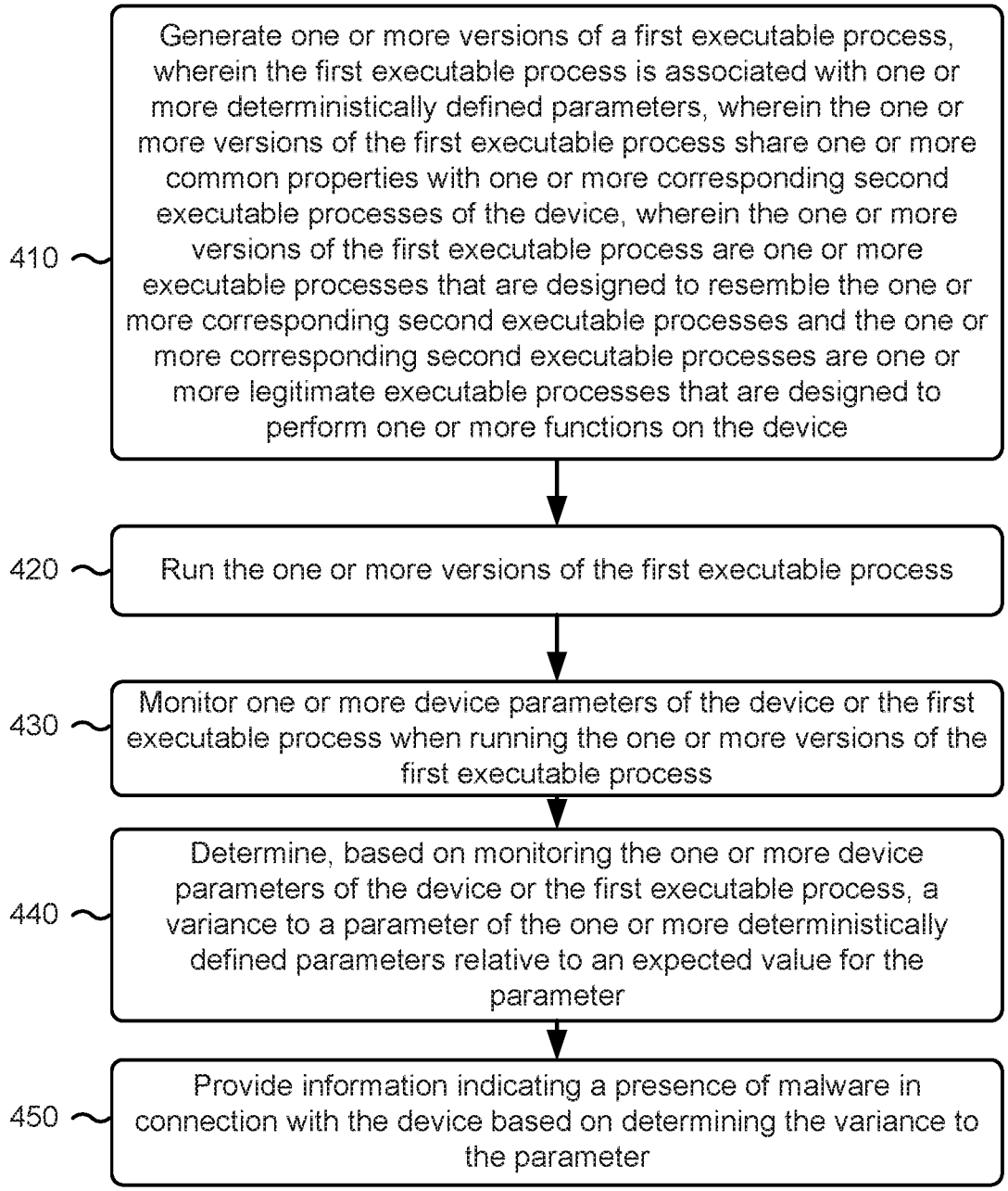
FIG. 4 is a flow chart of an example process for real-time signatureless malware detection.

FIG. 4 is a flow chart of an example process 400 for real-time signatureless malware detection. In some implementations, one or more process blocks of FIG. 4 may be performed by a device (e.g., an endpoint device, such as client device 210, network device 220, or server device 230). In some implementations, one or more process blocks of FIG. 4 may be performed by another device or a group of devices separate from or including the device.

As shown in FIG. 4, process 400 may include generating one or more versions of a first executable process, wherein the first executable process is associated with one or more deterministically defined parameters, wherein the one or more versions of the first executable process share one or more common properties with one or more corresponding second executable processes of the device, wherein the one or more versions of the first executable process are one or more executable processes that are designed to resemble the one or more corresponding second executable processes and the one or more corresponding second executable processes are one or more legitimate executable processes that are designed to perform one or more functions on the device (block 410). For example, the device (e.g., using processor 310, memory 315, storage component 320, controller 370, and/or the like) may generate one or more versions of a first executable process, as described above in connection with FIGS. 1A-1C. In some implementations, the first executable process may be associated with one or more deterministically defined parameters, and the one or more versions of the first executable process may share one or more common properties with one or more corresponding second executable processes of the device. In some implementations, the one or more versions of the first executable process may be one or more executable processes that are designed to resemble the one or more corresponding second executable processes and the one or more corresponding second executable processes are one or more legitimate executable processes that are designed to perform one or more functions on the device.

As further shown in FIG. 4, process 400 may include running the one or more versions of the first executable process (block 420). For example, the device (e.g., using processor 310, memory 315, storage component 320, controller 370, and/or the like) may run the one or more versions of the first executable process, as described above in connection with FIGS. 1A-1C.

As further shown in FIG. 4, process 400 may include monitoring one or more device parameters of the device or the first executable process when running the one or more versions of the first executable process (block 430). For example, the device (e.g., using processor 310, memory 315, storage component 320, communication interface 335, controller 370, and/or the like) may monitor one or more device parameters of the device or the first executable process when running the one or more versions of the first executable process, as described above in connection with FIGS. 1A-1C.

As further shown in FIG. 4, process 400 may include determining, based on monitoring the one or more device parameters of the device or the first executable process, a variance to a parameter of the one or more deterministically defined parameters relative to an expected value for the parameter (block 440). For example, the device (e.g., using processor 310, memory 315, storage component 320, controller 370, and/or the like) may determine, based on monitoring the one or more device parameters of the device or the first executable process, a variance to a parameter of the one or more deterministically defined parameters relative to an expected value for the parameter, as described above in connection with FIGS. 1A-1C.

As further shown in FIG. 4, process 400 may include providing information indicating a presence of malware in connection with the device based on determining the variance to the parameter (block 450). For example, the device (e.g., using processor 310, memory 315, storage component 320, output component 330, communication interface 335, switching component 360, output component 365, controller 370, and/or the like) may provide information indicating a presence of malware in connection with the device based on determining the variance to the parameter, as described above in connection with FIGS. 1A-1C.

Process 400 can include additional implementations, such as any single implementation or any combination of implementations described below and/or described with regard to any other process described herein.

In some implementations, the device may detect a presence of the malware based on determining the variance to the parameter, may determine a remediation technique for removing the malware after detecting the presence of the malware, and may automatically remove the malware using the remediation technique. In some implementations, the first executable process may include source code. In some implementations, the device may be an endpoint device or a sandbox device.

In some implementations, the one or more deterministically defined parameters may include a memory map associated with a defined behavior for the first executable process. In some implementations, the first executable process may reside in the one or more memories of the device and may maintain a static memory map during execution. In some implementations, the one or more common properties may include at least one of a common file name, a common library linkage, a common module linkage, a common dynamic-link library linkage, or a common dependency linkage.

In some implementations, the device may execute the one or more corresponding second executable processes in connection with executing the one or more versions of the first executable process. In some implementations, when executing the one or more corresponding second executable processes, the device may execute a second executable process, of the one or more corresponding second executable processes, in a suspended mode, may inject, into the second executable process, executable process code associated with a version, of the one or more versions, of the first executable process corresponding to the second executable process, and may execute the version, of the one or more versions, of the first executable process from the second executable process based on injecting the executable process code.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
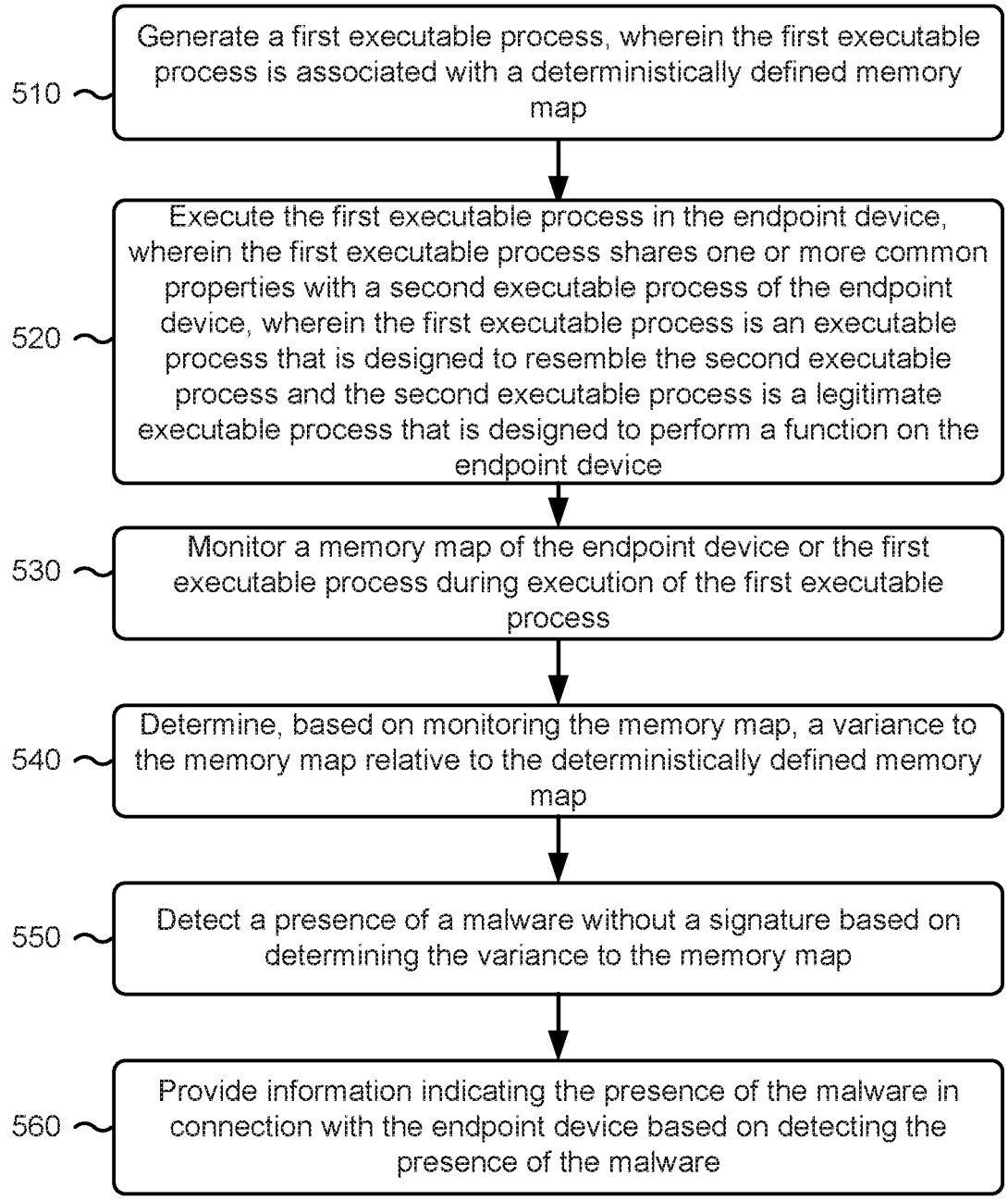
FIG. 5 is a flow chart of an example process for real-time signatureless malware detection.

FIG. 5 is a flow chart of an example process 500 for real-time signatureless malware detection. In some implementations, one or more process blocks of FIG. 5 may be performed by a device (e.g., an endpoint device, such as client device 210, network device 220, or server device 230). In some implementations, one or more process blocks of FIG. 5 may be performed by another device or a group of devices separate from or including the device.

As shown in FIG. 5, process 500 may include generating a first executable process, wherein the first executable process is associated with a deterministically defined memory map (block 510). For example, the endpoint device (e.g., using processor 310, memory 315, storage component 320, controller 370, and/or the like) may generate a first executable process, as described above in connection with FIGS. 1A-1C. In some implementations, the first executable process may be associated with a deterministically defined memory map.

As further shown in FIG. 5, process 500 may include executing the first executable process in the endpoint device, wherein the first executable process shares one or more common properties with a second executable process of the endpoint device, wherein the first executable process is an executable process that is designed to resemble the second executable process and the second executable process is a legitimate executable process that is designed to perform a function on the endpoint device (block 520). For example, the endpoint device (e.g., using processor 310, memory 315, storage component 320, controller 370, and/or the like) may execute the first executable process in the endpoint device, as described above in connection with FIGS. 1A-1C. In some implementations, the first executable process may share one or more common properties with a second executable process of the endpoint device. In some implementations, the first executable process may be an executable process that is designed to resemble the second executable process and the second executable process may be a legitimate executable process that is designed to perform a function on the endpoint device.

As further shown in FIG. 5, process 500 may include monitoring a memory map of the endpoint device or the first executable process during execution of the first executable process (block 530). For example, the endpoint device (e.g., using processor 310, memory 315, storage component 320, communication interface 335, controller 370, and/or the like) may monitor a memory map of the endpoint device or the first executable process during execution of the first executable process, as described above in connection with FIGS. 1A-1C.

As further shown in FIG. 5, process 500 may include determining, based on monitoring the memory map, a variance to the memory map relative to the deterministically defined memory map (block 540). For example, the endpoint device (e.g., using processor 310, memory 315, storage component 320, controller 370, and/or the like) may determine, based on monitoring the memory map, a variance to the memory map relative to the deterministically defined memory map, as described above in connection with FIGS. 1A-1C.

As further shown in FIG. 5, process 500 may include detecting a presence of a malware without a signature based on determining the variance to the memory map (block 550). For example, the endpoint device (e.g., using processor 310, memory 315, storage component 320, communication interface 335, controller 370, and/or the like) may detect a presence of a malware without a signature based on determining the variance to the memory map, as described above in connection with FIGS. 1A-1C.

As further shown in FIG. 5, process 500 may include providing information indicating the presence of the malware in connection with the endpoint device based on detecting the presence of the malware (block 560). For example, the endpoint device (e.g., using processor 310, memory 315, storage component 320, output component 330, communication interface 335, switching component 360, output component 365, controller 370, and/or the like) may provide information indicating the presence of the malware in connection with the endpoint device based on detecting the presence of the malware, as described above in connection with FIGS. 1A-1C.

Process 500 can include additional implementations, such as any single implementation or any combination of implementations described below and/or described with regard to any other process described herein.

In some implementations, when executing the first executable process, the device may execute the first executable process from one or more folders located on the endpoint device. In some implementations, the one or more folders may include at least one of a temporary folder, or a folder with a name associated with the second executable process. In some implementations, the device may alter a working directory of the first executable process to match a working directory of the second executable process.

In some implementations, when monitoring the memory map, the device may snapshot an instance of the memory map. In some implementations, when snapshotting the instance of the memory map, the device may determine at least one of a quantity of pages used in connection with the first executable process, a quantity of modules used in connection with the first executable process, a module ownership, a size of a page, a permission of the page, an address of the page, a module name corresponding to the page, a set of properties of the page, whether the page is committed, whether the page is reserved, or whether the page is private.

Although FIG. 5 shows example blocks of process 500, in some implementations, process 500 may include additional blocks, fewer blocks, different blocks, or differently arranged blocks than those depicted in FIG. 4. Additionally, or alternatively, two or more of the blocks of process 500 may be performed in parallel.

Figure 6:
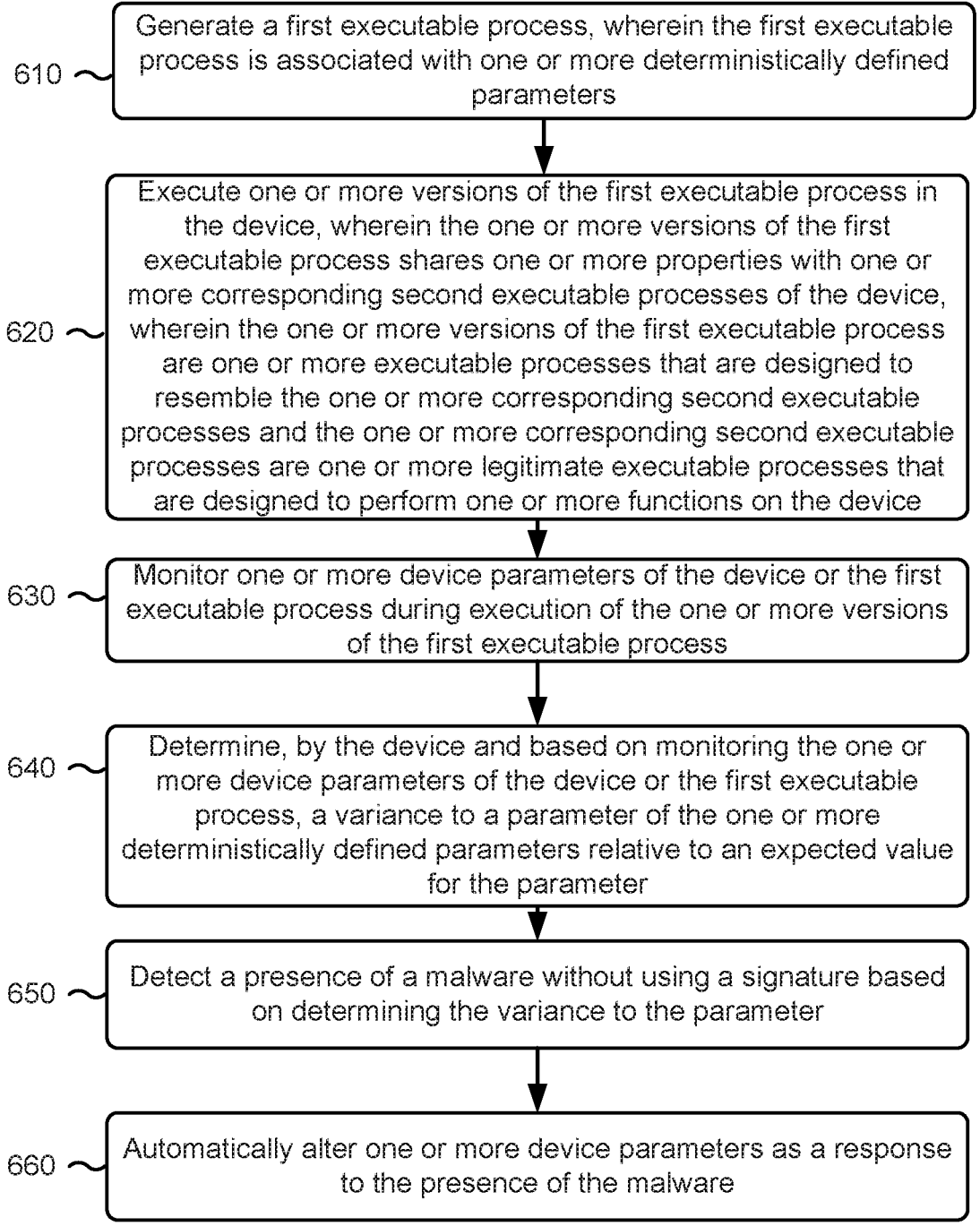
FIG. 6 is a flow chart of an example process for real-time signatureless malware detection.

FIG. 6 is a flow chart of an example process 600 for real-time signatureless malware detection. In some implementations, one or more process blocks of FIG. 6 may be performed by a device (e.g., an endpoint device, such as client device 210, network device 220, or server device 230). In some implementations, one or more process blocks of FIG. 6 may be performed by another device or a group of devices separate from or including the device.

As shown in FIG. 6, process 600 may include generating a first executable process, wherein the first executable process is associated with one or more deterministically defined parameters (block 610). For example, the device (e.g., using processor 310, memory 315, storage component 320, controller 370, and/or the like) may generate a first executable process, as described above in connection with FIGS. 1A-1C. In some implementations, the first executable process may be associated with one or more deterministically defined parameters.

As shown in FIG. 6, process 600 may include executing one or more versions of the first executable process in the device, wherein the one or more versions of the first executable process shares one or more properties with one or more corresponding second executable processes of the device, wherein the one or more versions of the first executable process are one or more executable processes that are designed to resemble the one or more corresponding second executable processes and the one or more corresponding second executable processes are one or more legitimate executable processes that are designed to perform one or more functions on the device (block 620). For example, the device (e.g., using processor 310, memory 315, storage component 320, controller 370, and/or the like) may execute one or more versions of the first executable process in the device, as described above in connection with FIGS. 1A-1C. In some implementations, the one or more versions of the first executable process may share one or more properties with one or more corresponding second executable processes of the device. In some implementations, the one or more versions of the first executable process may be one or more executable processes that are designed to resemble the one or more corresponding second executable processes and the one or more corresponding second executable processes may be one or more legitimate executable processes that are designed to perform one or more functions on the device.

As further shown in FIG. 6, process 600 may include monitoring one or more device parameters of the device or the first executable process during execution of the one or more versions of the first executable process (block 630). For example, the device (e.g., using processor 310, memory 315, storage component 320, communication interface 335, controller 370, and/or the like) may monitor one or more device parameters of the device or the first executable process during execution of the one or more versions of the first executable process, as described above in connection with FIGS. 1A-1C.

As further shown in FIG. 6, process 600 may include determining, by the device and based on monitoring the one or more device parameters of the device or the first executable process, a variance to a parameter of the one or more deterministically defined parameters relative to an expected value for the parameter (block 640). For example, the device (e.g., using processor 310, memory 315, storage component 320, communication interface 335, controller 370, and/or the like) may determine, based on monitoring the one or more device parameters of the device or the first executable process, a variance to a parameter of the one or more deterministically defined parameters relative to an expected value for the parameter, as described above in connection with FIGS. 1A-1C.

As further shown in FIG. 6, process 600 may include detecting a presence of a malware without using a signature based on determining the variance to the parameter (block 650). For example, the device (e.g., using processor 310, memory 315, storage component 320, controller 370, and/or the like) may detect a presence of a malware without using a signature based on determining the variance to the parameter, as described above in connection with FIGS. 1A-1C.

As further shown in FIG. 6, process 600 may include automatically altering one or more device parameters as a response to the presence of the malware (block 660). For example, the device (e.g., using processor 310, memory 315, storage component 320, controller 370, and/or the like) may automatically alter one or more device parameters as a response to the presence of the malware, as described above in connection with FIGS. 1A-1C.

Process 600 can include additional implementations, such as any single implementation or any combination of implementations described below and/or described with regard to any other process described herein.

In some implementations, monitoring the one or more device parameters may include monitoring for at least one of a set of process identifiers, a set of events, or a set of threads. In some implementations, the device may determine information regarding a state of the device based on determining the variance to the parameter, where the information is associated with at least one of a set of pages, a set of page artifacts, a set of indicators of compromise, a set of mutex names, a set of Internet Protocol addresses, a set of web addresses, a set of domain names, a set of strings, a set of registry keys, a set of messages, or a presence of code.

In some implementations, the device may determine a remediation technique for removing the malware after detecting the presence of the malware, and may automatically remove the malware using the remediation technique. In some implementations, the device may automatically isolate the malware after detecting the presence of the malware.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors to:
     generate one or more versions of a first executable process,
       wherein the first executable process is associated with one or more deterministically defined parameters,
       wherein the one or more versions of the first executable process share one or more common properties with one or more corresponding second executable processes of the device, and
       wherein the one or more versions of the first executable process are one or more executable processes that are designed to resemble the one or more corresponding second executable processes and the one or more corresponding second executable processes are one or more legitimate executable processes that are designed to perform one or more functions on the device;
     execute a second executable process, of the one or more corresponding second executable processes, in a suspended mode;
     inject, into the second executable process, executable process code associated with a version, of the one or more versions, of the first executable process corresponding to the second executable process;
     execute the version, of the one or more versions, of the first executable process from the second executable process based on injecting the executable process code;
     monitor one or more device parameters of the device or the first executable process when executing the version, of the one or more versions, of the first executable process;
     determine, based on monitoring the one or more device parameters of the device or the first executable process, a variance to a parameter of the one or more deterministically defined parameters relative to an expected value for the parameter; and
     provide information indicating a presence of malware in connection with the device based on determining the variance to the parameter.

2. The device of claim 1, wherein the one or more processors are further to:
   detect a presence of the malware based on determining the variance to the parameter;
   determine a remediation technique for removing the malware after detecting the presence of the malware; and
   automatically remove the malware using the remediation technique.

3. The device of claim 1, wherein the first executable process includes source code.

4. The device of claim 1, wherein the device is an endpoint device or a sandbox device.

5. The device of claim 1, wherein the one or more deterministically defined parameters include a memory map associated with a defined behavior for the first executable process.

6. The device of claim 1, wherein the first executable process resides in the one or more memories of the device and maintains a static memory map during execution.

7. The device of claim 1, wherein the one or more common properties include at least one of:
   a common file name,
   a common library linkage,
   a common module linkage,
   a common dynamic-link library linkage, or
   a common dependency linkage.

8. A non-transitory computer-readable medium storing instructions, the instructions comprising:
   one or more instructions that, when executed by one or more processors of an endpoint device, cause the one or more processors to:
     generate a first executable process,
       wherein the first executable process is associated with a deterministically defined memory map;
     execute the first executable process in the endpoint device,
       wherein the first executable process shares one or more common properties with a second executable process of the endpoint device, and
       wherein the first executable process is an executable process that is designed to resemble the second executable process and the second executable process is a legitimate executable process that is designed to perform a function on the endpoint device;
     execute the second executable process in a suspended mode;
     inject, into the second executable process, executable process code associated with the first executable process;
     execute the first executable process from the second executable process based on injecting the executable process code;

monitor a memory map of the endpoint device or the first executable process during execution of the first executable process;

determine, based on monitoring the memory map, a variance to the memory map relative to the deterministically defined memory map;

detect a presence of a malware without a signature based on determining the variance to the memory map; and provide information indicating the presence of the malware in connection with the endpoint device based on detecting the presence of the malware.

9. The non-transitory computer-readable medium of claim 8, wherein the one or more instructions, that cause the one or more processors to execute the first executable process, cause the one or more processors to:

execute the first executable process from one or more folders located on the endpoint device.

10. The non-transitory computer-readable medium of claim 9, wherein the one or more folders include at least one of:

a temporary folder, or a folder with a name associated with the second executable process.

11. The non-transitory computer-readable medium of claim 8, wherein the one or more instructions, when executed by the one or more processors, further cause the one or more processors to:

alter a working directory of the first executable process to match a working directory of the second executable process.

12. The non-transitory computer-readable medium of claim 8, wherein the one or more instructions, that cause the one or more processors to monitor the memory map, cause the one or more processors to:

snapshot an instance of the memory map.

13. The non-transitory computer-readable medium of claim 12, wherein the one or more instructions, that cause the one or more processors to snapshot the instance of the memory map, cause the one or more processors to:

determine at least one of:
a quantity of pages used in connection with the first executable process,
a quantity of modules used in connection with the first executable process,
a module ownership,
a size of a page,
a permission of the page,
an address of the page,
a module name corresponding to the page,
a set of properties of the page,
whether the page is committed,
whether the page is reserved, or
whether the page is private.

14. A method, comprising:

generating, by a device, a first executable process,
wherein the first executable process is associated with one or more deterministically defined parameters;

executing, by the device, one or more versions of the first executable process in the device,
wherein the one or more versions of the first executable process shares one or more properties with one or more corresponding second executable processes of the device, and
wherein the one or more versions of the first executable process are one or more executable processes that are designed to resemble the one or more corresponding second executable processes and the one or more corresponding second executable processes are one or more legitimate executable processes that are designed to perform one or more functions on the device;

executing, by the device, a second executable process, of the one or more corresponding second executable processes, in a suspended mode;

injecting, by the device and into the second executable process, executable process code associated with a version, of the one or more versions, of the first executable process corresponding to the second executable process;

executing, by the device, the version, of the one or more versions, of the first executable process from the second executable process based on injecting the executable process code;

monitoring, by the device, one or more device parameters of the device during execution of the version, of the one or more versions, of the first executable process;

determining, by the device and based on monitoring the one or more device parameters of the device or the first executable process, a variance to a parameter of the one or more deterministically defined parameters relative to an expected value for the parameter;

detecting, by the device, a presence of a malware without using a signature based on determining the variance to the parameter; and automatically altering, by the device, one or more device parameters as a response to the presence of the malware.

15. The method of claim 14, wherein monitoring the one or more device parameters comprises:

monitoring for at least one of:
a set of process identifiers,
a set of events, or
a set of threads.

16. The method of claim 14, further comprising:

determining information regarding a state of the device based on determining the variance to the parameter, wherein the information is associated with at least one of:
a set of pages,
a set of page artifacts,
a set of indicators of compromise,
a set of mutex names,
a set of Internet Protocol addresses,
a set of web addresses,
a set of domain names,
a set of strings,
a set of registry keys,
a set of messages, or
a presence of code.

17. The method of claim 14, further comprising:

determining a remediation technique for removing the malware after detecting the presence of the malware; and automatically removing the malware using the remediation technique.

18. The method of claim 14, further comprising:

automatically isolating the malware after detecting the presence of the malware.

19. The device of claim 1, wherein the one or more processors, when monitoring the one or more device parameters of the device or the first executable process, are to:

snapshot an instance of a memory map of the device.

20. The device of claim 1, wherein the one or more processors, when monitoring the one or more device parameters of the device or the first executable process, are to:
    monitor for at least one of:
        a set of process identifiers,
        a set of events, or
        a set of threads.

\* \* \* \* \*